Nov. 11, 1952 — C. L. KELSO — 2,617,678
PIPE LOWERING CLAMP
Filed Jan. 15, 1951

INVENTOR.
Clarence L. Kelso
BY
ATTORNEY.

Patented Nov. 11, 1952

2,617,678

UNITED STATES PATENT OFFICE 2,617,678

PIPE LOWERING CLAMP

Clarence L. Kelso, Oilton, Okla.

Application January 15, 1951, Serial No. 206,025

5 Claims. (Cl. 294—115)

This invention relates to clamping means particularly adapted for handling pipe.

It is common practice in laying cross-country pipe lines to weld together a plurality of sections and position the same over the ditch within which the same are to be laid supported by suitable timbers, or to lay the pipe preparatory to placing in the ditch along the side thereof. The pipe is thereupon treated with a protecting substance usually consisting of a thick layer of enamel-like material and while the enamel is hot and relatively fluid, the pipe is wrapped with either felt, paper or fibre-glass. This binds the enamel and after hardening thereof, the pipe is fully coated and protected against corrosion. If the enamel hardens properly, it is relatively brittle and if not sufficiently hardened at the time of lowering into the ditch, it is easily broken or mashed.

It is the present practice to utilize belts in the lowering process, which belts are slipped under the pipe and the ends thereof hooked into a cable emanating from a tractor boom for lifting the pipe. Use of belts in this fashion is rather unsatisfactory for several reasons. The belts are difficult to hook and release from the boom, place a tremendous pressure on the sides of the pipe when lifting the same, and are difficult to be pulled from the pipe when it is at the bottom of the ditch.

It is the most important object of the present invention therefore, to provide a clamp that may be used in connection with the pipe lowering boom capable of circumscribing the pipe to be lowered in such manner as to tremendously speed up the entire operation and do little if any damage to the aforesaid, either brittle or relatively soft coating on the pipe.

Another important object of the present invention is to provide a clamp for pipes that is easily manipulated and requiring little operator attention aside from releasing and locking a small trigger associated with the clamp.

Another important object of the present invention is the provision of a pipe clamp provided with a pair of jaws swingable toward and from each other and formed to present a semi-circular cradle for loosely receiving the pipe when the jaws are in an operative position next adjacent each other.

A further object of this invention is to provide a clamp having swingable jaws as just above indicated, together with a locking member in the form of a U, that is shiftable to and from a position embracing the jaws to hold the same in an operative position encircling the pipe to be handled.

It is still another object of this invention to provide a means for moving the locking member to an inoperative position and holding the same in such position while the clamp is moved toward and away from the pipe being handled.

Other important objects include details of construction, all of which will be made clear or become apparent as the following specification progresses, reference being had to the accompanying drawing, wherein.

Figure 1:
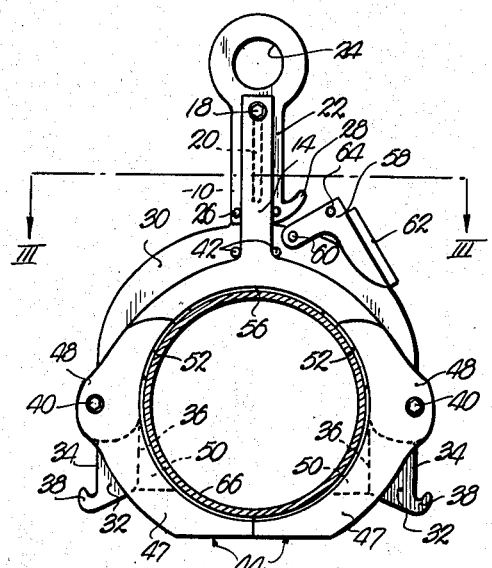
Figure 1 is a side elevational view of a pipe lowering clamp made pursuant to my present invention.

As will hereinafter appear, the clamp hereof is designed to completely encircle the pipe being handled and in this respect at least, differs from the clamp forming the subject matter of my co-pending application, Serial No. 45,696, filed August 23, 1948. This is a continuation in part of said co-pending application.

There is provided in the clamp of the present invention, a support broadly designated by the numeral 10 and including a pair of sections, the main section whereof is in the form of a pair of identical forks and designated by the numeral 12. Forks 12 are each provided with a central, elongated, normally vertical stem 14 having a substantially semi-circular lowermost end defined by a pair of arcuate branches 16. The uppermost ends of the stems 14 are joined by a bolt 18 that passes through an elongated slot 20 formed in a section 22 of support 10. Section 22 comprises an elongated bar having an opening 24 at the uppermost end thereof and disposed between the stems 14 in the manner illustrated in Figs. 2, 3 and 5. Accordingly, the section 22 is slidable relative to the section 12 and is guided along the stems 14 by a pair of spaced-apart pins 26 that slide along the edges of the stems 14. A laterally extending hook 28 is provided on the supporting section 22 adjacent the lowermost end thereof for reasons hereinafter to be made more clear.

A U-shaped locking member 30 has its bight disposed for sliding movement between the stems 14 and is provided with a pair of substantially parallel legs 32. Each leg 32 of the locking member 30 is provided with a pair of opposed, substantially parallel edges 34 and 36 and each terminates at the lowermost end thereof in a laterally extending hook 38. The legs 32 are disposed between the branches 16 of the sections 12 and legs 32 are disposed entirely within a pair of spaced-apart pivot bolts 40 joining the branches 16 at the lowermost ends thereof. Lateral displacement of the locking member 30 as the same is reciprocated from the position illustrated in Fig. 4 to the position shown in Fig. 1, is prevented by the edges 34 riding along the pivot bolts 40 and by a pair of spaced-apart pins 42 within the bight of locking member 30 and riding along the edges of stems 14 in the same manner as pins 26.

Figure 2:
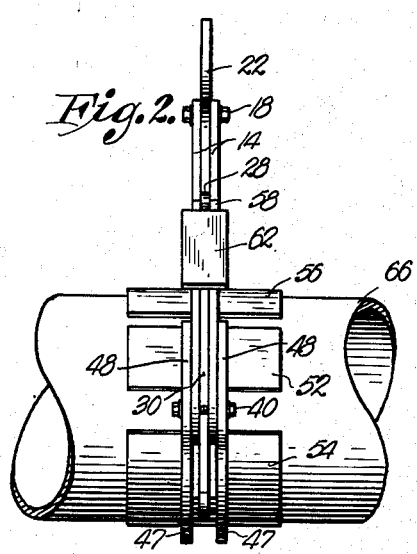
Fig. 2 is an edge elevational view thereof.
Figure 3:
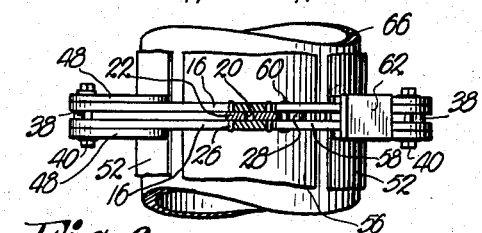
Fig. 3 is a cross-sectional view taken on line III—III of Fig. 1 looking in the direction of the arrows.
Figure 5:
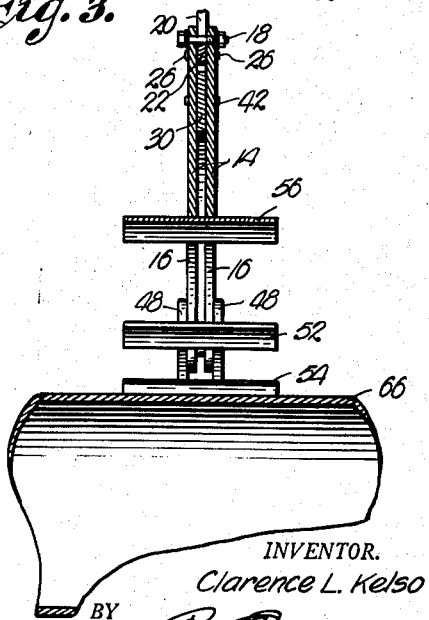
Fig. 5 is a cross-sectional view taken on line V—V of Fig. 4 looking in the direction of the arrows.

Each pin 40 respectively, swingably carries a jaw 44 having an arcuate innermost edge 46. Each jaw 44 comprises a pair of spaced-apart plates 47, each of which in turn includes a laterally extending ear 48. The ears 48 embrace the corresponding branches 16 as illustrated in Figs. 2, 3 and 5 and receive the corresponding pivot bolt 40. Each jaw 44 is provided with a substantially triangular-shaped block 50 mounted between the plates 47 thereof below pivot bolt 40 and disposed for engagement by the corresponding edge 36 of legs 32 when the locking member 30 is moved to a position embracing the jaws 44 as illustrated in Fig. 1.

Each jaw 44 respectively is provided with a pair of arcuate pads 52 and 54 of rubber or other suitable material and the supporting section 12 is likewise provided with a similar arcuate pad 56 at the point of merger between branches 16 and at the lowermost edge thereof.

An L-shaped trigger member 58 is swingably mounted upon the lock 30 as at 60 adjacent one of the pins 42, trigger 58 including a pair of spaced-apart plates as illustrated in Fig. 3 that embrace the locking member 30 at pivot 60 and are joined by a top plate 62.

Figure 4:
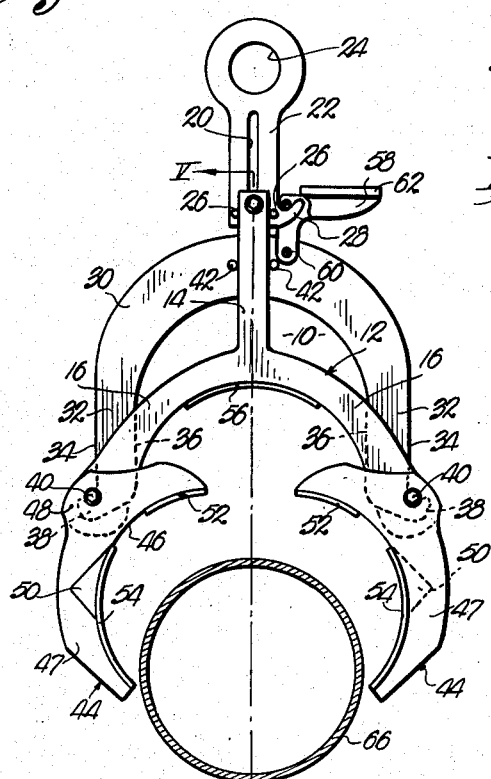
Fig. 4 is a side elevational view differing from Fig. 1 however, in that the clamp is shown in an inoperative position.

A pin 64 also interconnects the two aforesaid side plates of the trigger 58 in spaced, parallelism to the pivot pin 60 for engaging the hook 28 in the manner illustrated by Fig. 4 of the drawing. The pipe illustrated in the drawing to be engaged by the clamp just above described is designated by the numeral 66.

In operation, the clamp is normally carried by a hook, not shown, mounted upon the cable forming a part of a boom and passing through the opening 24 of supporting section 22. With the trigger 58 positioned as illustrated in Fig. 4 of the drawing and with pin 64 engaging hook 28, the sections 12 and 22 of support 10, will be extended while the clamp hangs from the boom and the locking member 30 will be in a retracted position with respect to jaws 44. As the clamp is lowered from the position illustrated in Fig. 4 toward the pipe 66, the paddings 52 of jaws 44 will first engage the pipe 66 progressively swinging the jaws 44 on their pivots 40 to a position encircling the pipe 66 as shown in Fig. 1. As the boom is lowered still further, lock 30 will slide downwardly with respect to the stems 14 and the legs 32 thereof will slide between bolts 40 and between the branches 16 to a point where the cam edges 36 of legs 32 will engage the outermost edge of blocks 50. This action will assure swinging movement of the jaws 44 to a pipe-encircling condition and when the locking member 30 is in embracing relationship to the blocks 50, outward swinging movement of the jaws 44 away from each other on their pivot bolts 40, will be prevented.

It is seen that the edges of blocks 50 which engage edges 36 are disposed substantially vertically and parallel when the locking member 30 is in an operative position holding the jaws 44 against outward swinging movement (see Fig. 1).

When the pad 56 comes into engagement with the pipe 66 during the lowering movement of the clamp as just described, section 22, trigger 58 and the lock 30 all descend simultaneously with respect to the supporting section 12, pins 42 guiding the locking member 30 and pins 26 serving as guides for the section 22 along the stems 14. As soon as pins 42 come into engagement with the branches 16 and the lock 30 thereby reaches the lowermost end of its path of travel, continued downward movement of the section 22 between the stems 14 causes the hook 22 to move out of engagement with the pin 64 of trigger 58 and the trigger 58 thereupon swings by force of gravity to pivot pin 60 from the position illustrated in Fig. 4 of the drawing to the position shown by Fig. 1 where top plate 62 engages the upper edge of lock 30. After the jaws 44 come into abutting engagement at the lowermost ends thereof, encircling pipe 66 and after the locking member 30 is released from section 22 and is in a locking position embracing the blocks 50, upward movement of the boom cable will again shift the section 22 upwardly with respect to section 12 and by virtue of the fact that trigger 58 is out of engagement with hook 28, lock 30 will remain in the operative position by its inherent weight. As soon as the lowermost end of slot 20 engages the bolt 18, the entire clamp, together with the pipe 66 will be lifted for movement as desired into a ditch or other position. Sufficient clearance is provided as shown in Fig. 1 of the drawing to cradle the pipe 66 within the jaws 44 and during the lifting action of the pipe 66 it will rest upon the pads 54 and be spaced slightly from the pad 56.

As soon as it is desired to release the clamp from the pipe 66, section 22 is lowered to the position illustrated in Fig. 1 of the drawing, where hook 28 is in a position for receiving pin 64. All that the operator need do is to swing trigger 58 to the position illustrated in Fig. 4 of the drawing, whereupon upward movement of the section 22 will cause hook 28 to engage the pin 64. Continued upward movement of the section 22 with respect to the section 12 will first cause the locking member 30 to rise to the position shown in Fig. 4, and as soon as the lowermost edge of the slot 22 engages bolt 18 and the hooks 38 engage the bolts 40, the entire clamp may be raised from its position adjacent pipe 66. The jaws 44 will thereupon automatically swing from the pipe 66 on the bolts 40 and all of the parts of the clamp will be positioned relatively substantially as illustrated in Figs. 4 and 5 of the drawing ready for further use.

It is seen that through use of the clamp hereof, pipe 66 may be handled with ease and that any coating thereon will be protected against damage during movement of the pipe 66 into a ditch or the like. Furthermore, it is a simple matter to release the clamp after the pipe 66 has been moved to a position resting within the ditch by merely swinging the trigger 58 to a position where it will be received by the hook 28, and, it is apparent that the operation for moving the clamp to a pipe-engaging position, can take place without any operator attention whatsoever other than aligning the clamp with respect to the pipe 66 since trigger 58 releases automatically as soon as the section 22 moves to the lowermost end of its path of travel with respect to the stems 14 of support section 12.

Having thus described the invention, what is claimed as new and desired to be secured by Letters Patent is:

1. In a clamp, a fork having a pair of opposed branches; a jaw swingably carried by each branch respectively; a locking member reciprocably mounted on the fork for movement to and from a position partially embracing the jaws; a support section shiftably mounted on the fork and provided with a hook; and releasable means swingably mounted on the locking member for movement to and from a position engaging said hook on the support section, whereby to move the locking member out of embracing relationship with the jaws as the support member is shifted in one direction relative to the fork.

2. In a clamp, a fork having a pair of opposed branches, each provided with a pivot bolt; a jaw swingably carried by each bolt respectively; a U-shaped locking member having a pair of opposed legs between the bolts in sliding engagement therewith and mounted on the fork for movement to and from a position in partial embracing engagement with the jaws; and a hook on each leg respectively for engagement with said bolts whereby to lift the fork and the jaws as the locking member is moved in one direction relative to the fork.

3. In a clamp, a fork having a pair of opposed branches, each provided with a pivot bolt; a jaw swingably carried by each bolt respectively; a U-shaped locking member having a pair of opposed legs between the bolts in sliding engagement therewith and mounted on the fork for movement to and from a position in partial embracing engagement with the jaws; a support section shiftably mounted on the fork and provided with a hook; and releasable means swingably mounted on the locking member for movement to and from a position engaging said hook on the support section, whereby to move the locking member out of embracing relationship with the jaws as the support member is shifted in one direction relative to the fork.

4. In a clamp, a fork having a pair of opposed branches, each provided with a pivot bolt; a jaw swingably carried by each bolt respectively; a U-shaped locking member having a pair of opposed legs between the bolts in sliding engagement therewith and mounted on the fork for movement to and from a position in partial embracing engagement with the jaws; a hook on each leg respectively for engagement with said bolts whereby to lift the fork and the jaws as the locking member is moved in one direction relative to the fork; a support section shiftably mounted on the fork and provided with a hook; and releasable means swingably mounted on the locking member for movement to and from a position engaging said hook on the support section, whereby to move the locking member out of embracing relationship with the jaws as the support member is shifted in one direction relative to the fork.

5. In a clamp, a fork having a vertical stem provided with a pair of opposed branches; a jaw swingably carried by each branch respectively; a locking member mounted on said stem for vertical reciprocation thereon to and from a position partially embracing said jaws; a support section mounted on said stem for vertical reciprocation thereon; a hook on the support section; means on the locking member engageable with said hook; hook means on the locking member; and means on the fork engageable with said hook means, whereby as the support section is raised it will raise the locking member and the latter will raise the fork and the jaws thereon.

CLARENCE L. KELSO.

REFERENCES CITED

The following references are of record in the file of this patent:

UNITED STATES PATENTS

| Number | Name | Date |
|---|---|---|
| 941,558 | Cloak | Nov. 30, 1909 |
| 1,760,885 | Prelesnik | June 3, 1930 |
| 2,544,142 | Dritley | Mar. 6, 1951 |